3,422,099
7-[α-HYDROXY-(2' OR 3'-THIENYL)-ACETAMIDO] CEPHALOSPORANIC ACIDS AND RELATED SALTS AND DERIVATIVES

Leonard B. Crast, Jr., North Syracuse, N.Y., assignor to Bristol-Myers Company, New York, N.Y., a corporation of Delaware
No Drawing. Filed Feb. 18, 1966, Ser. No. 528,399
U.S. Cl. 260—243                    7 Claims
Int. Cl. A61k 21/00; C07d 93/08

ABSTRACT OF THE DISCLOSURE

New synthetic compounds which relate to 7-α-hydroxy (2'- or 3'-thienyl) acetamido acids. These compounds are useful as antibacterial agents.

---

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria and especially Salmonella and Shigella and, more particularly, relates to 7-[α-hydroxy-(2'- or 3'-thienyl)acetamido] cephalosporanic acids which may bear certain substituents on the thiophene ring and related salts and derivatives.

Antibacterial agents in the past have proven highly effective in the therapy of infections due to either Gram-positive or Gram-negative bacteria but few are effective against both, very few are effective in concentrations below 5.0 mcg./ml. and none are very effective in practical use against infections caused by Salmonella, e.g., *S. enteritidis*. It was the object of the present invention to provide novel compounds effective against both Gram-positive and Gram-negative bacteria including the resistant strains. It was a further object of the present invention to provide cephalosporins active against Gram-positive and Gram-negative bacteria which are also efficiently absorbed upon parenteral or oral administration to man and animals.

The objects of the present invention have been achieved by the provision, according to the present invention, of the compounds of the formula (I) 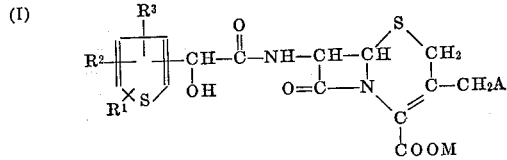

wherein $R^1$, $R^2$ and $R^3$ are each hydrogen, chloro, bromo, fluoro, iodo, nitro, (lower)alkyl, (lower)alkoxy, (lower)alkylthio, di(lower)alkylamino, (lower)alkanoylamino, (lower)alkanoylamino, (lower)alkanoyl or (lower)alkylsulfonyl;

A is hydrogen, hydroxyl, (lower)alkanoyloxy containing 2-8 carbon atoms, e.g., acetoxy, propionoyloxy, butanoyloxy, pentanoyloxy, etc., benzoyloxy, a quaternary ammonium radical, e.g. pyridinium, quinolium, picolinium, lutidinium, or when taken together with M, a monovalent carbon-oxygen bond; and M is hydrogen, a pharmaceutically acceptable nontoxic cation, an anionic charge when A is a quaternary ammonium radical, or, when taken together with A, a monovalent carbon-oxygen bond.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g., "(lower)alkoxy," it refers to the alkyl portion of such group which is therefore as described above in connection with "(lower)alkyl."

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower)alkanoyy includes acetyl, propionyl, butyryl, etc.; (lower)alkylsulfonyl includes methylsulfonyl, ethylsulfonyl, hexylsulfonyl, etc.; di(lower)alkylamino includes dimethylamino, diethylamino, ethylmethylamino, etc.

For clarity, we have illustrated below the formulae of the compounds when, in Formula I, A is a quaternary ammonium radical (pyridinium) and M is an anionic charge and when A and M together are a monovalent carbon-oxygen bond.

(II) 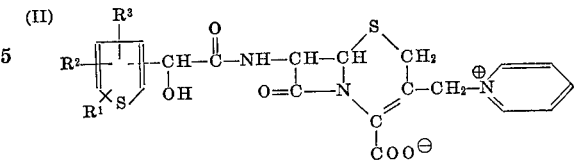

(III) 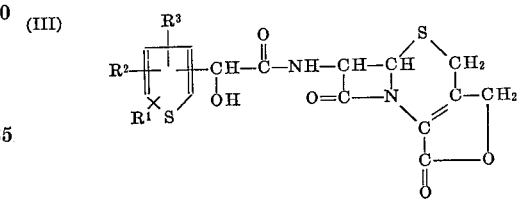

The preferred embodiments of the present invention are the free acids and salts thereof of which the free acids have the formulae (IV) 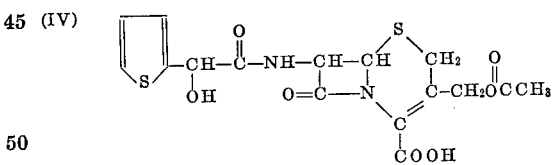

and (V) 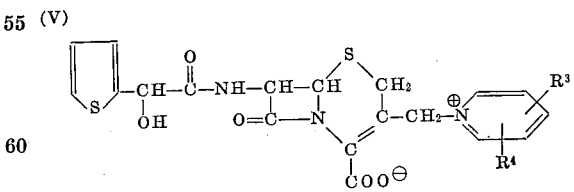

wherein $R^3$ and $R^4$ each represent hydrogen or methyl.

The pharmaceutically-acceptable, nontoxic cations include metallic cations such as sodium, potassium, calcium and aluminum and organic amine cations such as trialkylamines, e.g. triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N - (lower)alkyl-piperidines, e.g. N-ethylpiperidine, and other amines which have been used to form salts with benzylpenicillin.

The products of the present invention are prepared by the reaction of a compound of the formula

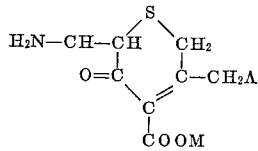

wherein A and M are described above (preferably in the form of a neutral salt such as the sodium salt or the triethylamine salt, i.e., when A is hydrogen, hydroxy, (lower)alkanoyloxy or benzoyloxy) with an active ester, e.g., 2,4-dinitrophenyl ester, p-nitrophenyl ester or N-hydroxysuccinimido ester, of an acid having the formula

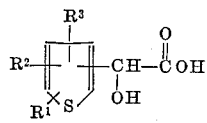

(in which $R^1$, $R^2$ and $R^3$ have the meaning set forth above) or with its functional equivalent as an acylating agent for a primary amino group. Such equivalents include the corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with 7-aminocephalosporanic acid after first reacting said free acid with N,N'-dimethylchloroforminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African patent specification 63/2684] of a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc., 77, 1067, (1955)] or of alkynylamine reagent [cf. R. Buijle and H. G. Viehe, Angew. Chem., International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a cephalosporin and the methods used to isolate the cephalosporin so-produced are well-known in the art (cf. U.S. Patents Nos. 3,079,314, 3,117,126 and 3,129,224 and British Patents Nos. 932,644, 957,570 and 959,054).

The compounds of Formula VI used in the present invention include 7-aminocephalosporanic acid and derivatives of 7-aminocephalosporanic acid. 7-aminocephalosporanic acid is prepared by hydrolysis of cephalosporin C and has the formula

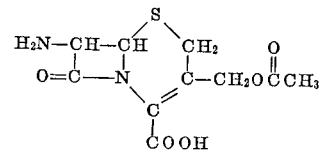

Acid hydrolysis of cephalosporin C to produce 7-aminocephalosporanic acid results in the coproduction of the lactone, 3-hydroxymethyl-7-aminodecephalosporanic acid lactone, formed by the further hydrolysis of the acetoxy group and subsequent internal esterification. The lactone has the formula

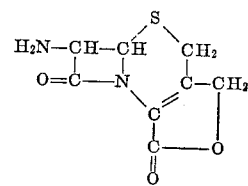

Enzymatic hydrolysis of the acetoxy group of 7-aminocephalosporanic acid results in the formation of 3-hydroxymethyl-7-aminodecephalosporanic acid having the formula

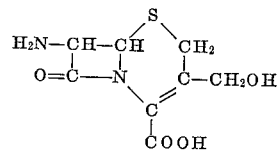

and such compound may be re-esterified with benzoic acid or a lower alkanoic acid, e.g., acetic acid, propionic acid and the like to form other esters. Preferably, re-esterification is carried out on a 3-hydroxymethyl-7-(α-hydroxy-thienylacetamido)-decephalosporanic acid which is obtained by enzymatic hydrolysis of a 7-(α-hydroxy-thienylacetamido)cephalosporanic acid.

Treatment of cephalosporin C with a tertiary amine, e.g., pyridine, lutidines, picolines and the like, followed by acid hydrolysis produces a nucleus which, in the case of pyridine, has the formula

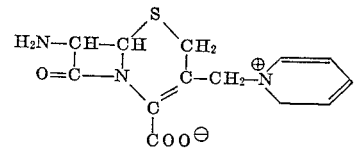

and has been given the name 3-pyridiniummethyl-7-aminodecephalosporanic acid inner salt.

The foregoing nuclei and the preparation thereof are known in the art and are described for example in U.S. Patent No. 3,117,126 and British Patents Nos. 932,644, 957,570 and 959,054.

3-methyl-7-aminodecephalosporanic acid having the formula

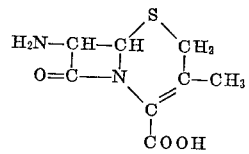

is produced by catalytic reduction of cephalosporin C followed by hydrolytic removal of the 5-aminoadipoyl side chain as described in U.S. Patent No. 3,129,224.

There is also provided by the present invention a group of α - keto - thienylacetamidocephalosporins having the formula (VII) 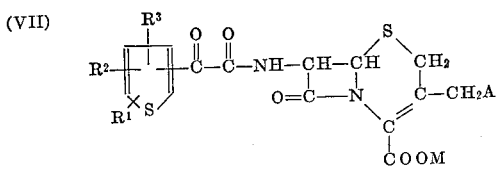

wherein $R^1$, $R^2$, $R^3$, A and M have the meaning set out above. These compounds are useful antibacterial agents but are particularly useful as intermediates in the preparation of the α-hydroxy-thienylacetamidocephalosporins described above. These keto compounds are prepared by the reaction with Compound VI of an acid chloride having the formula

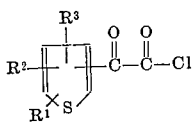

wherein $R^1$, $R^2$ and $R^3$ each has the meaning set forth above, or its functional equivalent as an acrylating agent for a primary amino group. Such equivalents include the corresponding carboxylic acid bromides, acid anhydridies and mixed anhydrides with other carboxylic acids, including monoesters, and particularly lower aliphatic esters, of carbonic acid.

The substituted α-(2- or 3-heterocyclic)-α-keto acetic acids and the corresponding acetyl chlorides which are used in the preparation of the compounds of the present invention may be prepared by a variety of synthetic methods which are common in the art. Most of these starting compounds are described in the prior art and many of them are commercially available. Detailed discussions of methods for the preparation of these starting materials are found in such reference works as the "Chemistry of Carbon Compounds," E. H. Rodd, editor (1956), Elsevier Publishing Company. The preparation of 2-thienylglyoxylic acid chloride is illustrative of such methods of preparation and is set forth in the examples below. The acids may be prepared according to the procedures described generally in J. Amer. Chem. Soc., 66, 1645–1648 (1944), by means of a Friedel-Crafts type reaction with the appropriate thiophene or furan compound and a chloride of oxalic acid. The preparation of 2-furylglyoxylic acid is described in Chem. Ber. 87, pages 276–282.

The preferred α-hydroxycephalosporins of the present invention are prepared by first preparing the appropriate α-keto cephalosporin as described above and then contacting such α-keto cephalosporin or a salt thereof in a liquid medium with at least one equivalent of a member selected from the group consisting of sodium borohydride, sodium trimethoxyborohydride and potassium borohydride to produce the corresponding hydroxycephalosporin and salts thereof. More specifically, the process for the production of hydroxycephalosporins comprises contacting in a substantially aqueous medium at a pH greater than about 7 and at a temperature in the range of about −5° C. to about 40° C. a member selected from the group consisting of an α-ketocephalosporin described in Formula VII above and salts thereof with from 1 to 12 equivalents of a member selected from the group consisting of sodium borohydride, sodium trimethoxyborohydride and potassium borohydride to produce the corresponding hydroxycephalosporin and salts thereof. When used as intermediates in the chemical process for the production of the α-hydroxycephalosporins, the α-ketocephalosporins of Formula VII may be used either in the acid form or as a salt; it is not necessary that the salts be nontoxic but the cation should be one which does not interfere with the chemical reduction reaction.

In the preparation of the preferred cephalosporin of this invention, 7 - [α - hydroxy - α - (2-thienyl)acetamido] cephalosporanic acid, the appropriate α-ketocephalosporin, the potassium salt of 7-(2-thienylglyoxylamindo)cephalospronic acid, is first prepared by the acid chloride procedure which is described above and which is illustrated in the following examples and this α-ketocephalosporin is then reduced with sodium borohydride, as illustrated in the following examples. The preparation of the borohydrides and certain methods of their use are described in U.S. Patent No. 2,683,721.

Another excellent method whereby the α-hydroxycephalosporins of this invention may be prepared involves the reaction of 7-aminocephalosporanic acid with an α-hydroxy acid having the formula (VIII) 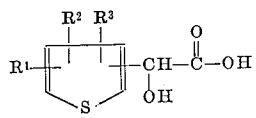

wherein $R^1$ and $R^2$ and $R^3$ each has the meaning set forth above, in the presence of a carbodiimide. This method of forming the α-hydroxycephalosporins, which does not require the formation of the corresponding α-ketocephalosporin as an intermediate, facilitates the formation of one of the pure diastereoisomers of the compounds of this invention. The reaction may be carried out by adding a solution of the carbodiimide, such as N,N' - dicyclohexylcarbodiimide, in dioxane to a solution of the sodium salt of 7-aminocephalosporanic acid in water and dioxane.

In addition, an acid azide or an active ester or thioester (e.g., with p-nitrophenol, thiophenol, thioacetic acid), may be used or the free acid itself may be coupled with 7-aminocephalosporanic acid by the use of enzymes or of a carbodiimide reagent [cf. Sheehan and Hess, J. Amer. Chem. Soc., 77, 1067 (1955)].

Another generally useful equivalent of the acid chloride is a corresponding azolide, i.e., an amide of the corresponding acid whose amide nitrogen is a member of a quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential.

The α-carbon atom of the acyl group (to which the α-hydroxyl is attached) is an asymmetric carbon atom and the compounds of this invention can therefore exist in two optically active isomeric forms (the D- and L-diastereoisomers), as well as in a mixture of the two optically active forms; all such isomeric forms of the compounds are included within the scope of the present invention. Also included within the scope of the present invention are easily hydrolyzed esters which are converted to the free acid form by chemical or enzymatic hydrolysis.

It should be noted in connection with the foregoing consideration of the diastereoisomers of this invention that many isomers other than the two caused by the asymmetric carbon of the side chain are possible due to the pressure of asymmetric carbon atoms in the 7-aminocephalosporanic acid nucleus. Such additional isomers, however, are not presently significant since 7-aminocephalosporanic acid which is the product of fermentation processes is consistently of one configuration; such 7-aminocephalosporanic acid is presently used in the production of the compounds of this invention.

In the process for the preparation of the compounds of Formulae I and VII above, the compounds are sometimes in aqueous solution in the form of their sodium or potassium salt. These compounds in the aqueous phase can then be converted to the free acid, preferably in the cold under a layer of ether by the addition of dilute mineral acid, e.g., 5 N $H_2SO_4$ to pH 2. The free acid can then be extracted into a water-immiscible neutral organic solvent such as ether, the extract washed with water quickly in the cold, if desired, and dried, as with anhydrous $Na_2SO_4$ and the free acid recovered from the ethereal solution. The product in the ethereal extract in its free acid form can then be converted to any desired metal or amine salt, particularly the pharmaceutically acceptable nontoxic amine salts described above, by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

The thienylglycolic acids ($\alpha$-hydroxy-thienylacetic acids) used in the present invention are prepared and/or resolved according to the procedures described in the literature, e.g., by Blicke et al., J. Amer. Chem. Soc., 66, 1645–1648 (1944); by Ernst, Berichte, 19, 3278–3282 (1886); by Campaigne et al., J. Amer. Chem. Soc., 75, 2702–2704 (1953); by Gronowitz, Arkiv. Kemi, 13, 231–238 (1958)—see Chemical Abstracts, 53, 15056 ad; by Gronowitz, Arkiv. Kemi, 13, 87–96 (1958)—see Chemical Abstracts, 53, 17091h; by Gronowitz, Arkiv. Kemi, 11, 519–526 (1957)—see Chemical Abstracts, 52, 10050a.

The following examples will serve to illustrate this invention without limiting it thereto. All temperatures are given in degrees centigrade.

Example 1

(A) $\alpha$-(2-thienyl)glyoxylic acid.—To a stirred solution of 100.8 g. (0.8 mole) of 2-acetylthiophene (Aldrich) in 600 ml. pyridine was added, in portions, 137 g. (1.24 mole) selenium dioxide (Matheson, Coleman and Bell) in portions at 60° C. The slurry was then cautiously heated to 90° C. whereupon an exothermic reaction began and the temperature rose to 100° C.+. Cooling was applied to reduce the temperature to 90° C. and the temperature was maintained at 90° C. for two hours. The slurry was then cooled and diluted with 600 ml. water and filtered through diatomaceous earth ("Supercel") filter aid with suction. The filtrate was then steam distilled to remove the pyridine. The resulting aqueous solution was then treated with activated charcoal ("Darko K–B"), filtered, and concentrated to about 200 ml. This solution was cooled and acidified to pH 2 with 40% $H_3PO_4$, saturated with salt and extracted with three 300 ml. portions of ether. The combined extracts were washed with three 50 ml. portions of water and dried over anhydrous $Na_2SO_4$ for two hours at 5° C. The ether solution was then filtered and concentrated to an oil. Benzene was then added and removed in vacuo to remove any remaining water. The light yellow oil was then dissolved in 700 ml. hot benzene and seeded with authentic $\alpha$-(2-thienyl) glyoxylic acid made by the procedure: J.A.C.S., 66, 1646 (1944). Upon cooling and standing there was obtained 79 g. of $\alpha$-(2-thienyl)-glyoxylic acid as light yellow crystals M.P. 91° C. There was no depression of the M.P. when mixed with authentic material. The yield was 83% of theory.

(B) $\alpha$-(2-thienyl)glyoxylyl chloride.—A mixture of 16 g. (0.11 mole) of 2-thienylglyoxylic acid, 20 ml. thionyl chloride and two drops of pyridine was heated with shaking until a vigorous reaction began. After about five minutes the heat was again applied and the solution refluxed for one hour. The acid chloride distilled at 96° C. at 9 mm. Hg. to yield 15 g. (80%) of $\alpha$-(2-thienyl)glyoxylyl chloride.

Analysis.—Calc'd for $C_6H_3ClSO_2$: C, 41.60; H, 1.74; Cl, 20.30. Found: C, 42.06; H, 2.02; Cl, 22.58.

The acid chloride crystallized to a solid having a melting point of 33–34° C.

(C) Sodium 7-(2 - thienylglyoxylamido)cephalosporanate.—To a stirred and cooled solution (5° C.) of 5.444 g. (0.02 mole) of 7-aminocephalosporanic acid (7-ACA) and 5.6 ml. (0.04 mole) triethylamine in 100 ml. methylene chloride was added, dropwise, a solution of 2.92 g. (0.02 mole) 2-thienylglyoxylyl chloride in 50 ml. $CH_2Cl_2$ over a 30-minute period. The ice bath was then removed and stirring continued for one and one-half hours. The $CH_2Cl_2$ was then removed in vacuo and the oily residue shaken in 100 ml. of 2% $NaHCO_3$ (aqueous) and 100 ml. ether. The aqueous phase was separated and with cooling and stirring under a layer of 100 ml. ethyl acetate it was acidified to pH 2 with 40% $H_3PO_4$. The ethyl acetate extract was then separated and a second 50 ml. ethyl acetate extract taken and combined with the first. These were washed with three 100 ml. portions of water and two 100 ml. portions of saturated $Na_2SO_4$ solution. The ethyl acetate solution was then dried briefly over $MgSO_4$, filtered and treated with 10 ml. 50% sodium 2-ethylhexanoate in n-butanol. The resulting precipitate was filtered off and washed with ethyl acetate and finally Skellysolve B (petroleum ether) and dried over $P_2O_5$ under vacuum. The yield was 7.1 g. (82.2% of theory) of sodium 7-(2-thienylglyoxylamido)cephalosporanate. The decomposition point was 155° C. and the infrared and NMR analyses were consistent with the desired structure.

Analysis.—Calc'd for $C_{16}H_{13}N_2O_7S_2 \cdot Na$: C, 44.44; H, 3.03; N, 6.49. Found: C, 43.24; H, 3.21; N, 6.50.

This compound exhibited M.I.C.'s in mcg./ml. of 0.25 vs. S. aureus Smith, of 0.8 v. S. aureus Bx–1633–2 and 6.2 vs. S. enteritidis.

(D) Sodium 7-[$\alpha$-hydroxy-$\alpha$ - (2-thienyl)acetamido] cephalosporanate.—To a stirred and cooled solution of 5 g. of anhydrous sodium acetate and 5.60 g. (0.013 mole) sodium 7-(2 - thienylglyoxylamido)cephalosporanate in 100 ml. water at 5° C. was added, in portions, 900 mg. (0.0243 mole) $NaBH_4$ (sodium borohydride; Metal Hydrides Co.) over a 45-minute period. The pH was adjusted periodically by adding a few drops of glacial acetic acid alternately with the $NaBH_4$ to maintain the pH at 7.5 to 8.5. After the additions the pH was kept at 8 for 45 minutes with the ice bath removed. At this point the solution was layered with 100 ml. of ethyl acetate and with cooling and vigorous stirring was added 40% $H_3PO_4$ until pH 2 was reached. The ethyl acetate extract was combined with a second 100 ml. ethyl acetate extract and washed with three 200 ml. portions water and two 200 ml. portions saturated $Na_2SO_4$ solution. The ethyl acetate solution was then filtered through anhydrous $Na_2SO_4$ and the $Na_2SO_4$ was washed with three twenty-five ml. portions ethyl acetate and all were combined. To this solution was added 5 ml. 50% sodium 2-ethylhexanoate in n-butanol (NaEH). An oil separated but redissolved when 100 ml. n-butanol was added. The solution was then placed on the rotary evaporator and at 25° C. under reduced pressure the ethyl acetate was removed. When all but approximately 75 ml. solution remained the product crysallized and was filtered off, washed with three 50 ml. portions n-butanol and five 50 ml. portions anhydrous ether and vacuum dried at 1 mm. Hg over $P_2O_5$ for 24 hours. The yield was 1.050 g. of sodium 7-[$\alpha$-hydroxy-$\alpha$ - (2 - thienyl)acetamido]cephalosporanate decomposing at 160° C. The IR and NMR analyses were consistent with structure.

Analysis.—Calc'd for $C_{16}H_{15}N_2O_7S_2Na$: C, 44.24; H, 3.48; N, 6.45. Found: C, 43.40; H, 2.95; N, 6.72. Karl Fisher $H_2O$=5.11%.

This compound in vitro exhibited Minimum Inhibitory Concentrations of about 0.5 mcg./ml. vs. S. aureus Smith, of about 1.6–3.1 mcg./ml. vs. the benzylpenicillin-resistant S. aureus Bx–1633–2, of about 0.25 mcg./ml. vs. D. pneumoniae, of about 0.8 mcg./ml. vs. S. enteritidis of about 3.1 mcg./ml. vs. S. typhosa and of about 3.1 mcg./ml. vs. Shigella sonnei and in mice versus S. aureus Smith exhibited $CD_{50}$'s of about 1.8 mgm./kg. upon intramuscular injection and about 5.2 mgm./kg. upon oral administration.

Example 2

3-pyridiniummethyl-1 - aminodecephalosporanic acid inner salt (1.5 g.) is shaken with methylene chloride at room temperature until the mixture becomes homogeneous and this solution is used in place of the 7-aminocephalosporanic acid solution in the procedure of Example 1 to prepare 3-pyridiniummethyl-7-[α-hydroxy-α-(2-thienyl)acetamido]decephalosporanic acid inner salt. This product is sensitive to light so that it is advisable to protect it from light as much as practical during its manufacture and subsequent processing and packaging.

Example 3

Pyridine (10 ml.) is added with stirring to a mixture of water (50 ml.) and 7-[α-hydroxy-α-(2-thienyl)acetamido]cephalosporanic acid (5 g.) to form a solution which is left under nitrogen at about 45° C. for twelve hours and then extracted four times with 20 ml. methylene chloride. The aqueous phase is concentrated in vacuo at about 30° C. and then passed through a column containing a strongly basic, anion exchange resin of the quaternary ammonium type (e.g., "Dowex 1") in the acetate cycle. The eluates containing the desired pyridine derivative as judged polarimetrically are combined, lyophilized and triturated in methanol to give solid 3-pyridiniummethyl-7-[α-hydroxy - α - (2-thienyl)acetamido]decephalosporanic acid inner salt. By concentrating the methanol triturate at 30° C. in vacuo and then pouring the concentrate so obtained into a large volume of acetone there is precipitated an additional amount of this product.

Example 4

Substitution of an equal volume of α-picoline, γ-picoline and 2,4-lutidine, respectively, for pyridine in the procedure of Example 3 produces 3-α-picoliniummethyl-7-[α-hydroxy-α-(2-thienyl)acetamido]decephalosporanic acid inner salt,
3-γ-picoliniummethyl-7-[α-hydroxy-α-(2-thienyl)acetamido]decephalosporanic acid inner salt, and
3,2',4'-lutidiniummethyl-7-[α-hydroxy-α-(2-thienyl)acetamido]decephalosporanic acid inner salt, respectively.

Example 5

The product of Example 1 is dissolved in water and treated with acetylesterase obtained from orange peels according to the procedure of Jansen et al., Arch. Biochem., 15, 415 (1947) at pH 6 for 15 hours. The resulting solution is passed through a column containing a weak, anionic ion exchange resin (e.g., "Amberlite IR 4B") in the acetate form and the column is then eluted with aqueous acetic acid which has been adjusted to pH 5.5 with pyridine. The eluate is adjusted to pH 8 by the addition of sodium hydroxide and is then evaporated in vacuo to give 3-hydroxymethyl-7-[α-hydroxy-α-(2 - thienyl)acetamido]-decephalosporanic acid in the form of its sodium salt.

Example 6

When in Example 1 the 7-aminocephalosporanic acid is replaced by an equimolar amount of 3-methyl-7-aminodecephalosporanic acid there is obtained the sodium salt of 3-methyl-7-[α-hydroxy-α-(2-thienyl)acetamido]decephalosporanic acid.

Example 7

In the procedure of Example 1, Steps B, C and D, the 2-thienylglyoxylic acid used therein is replaced by an equimolar weight of 3-chloro-2-thienylglyoxylic acid,
4-bromo-2-thienylglyoxylic acid,
5-iodo-2-thienylglyoxylic acid,
3-fluoro-2-thienylglyoxylic acid,
4-nitro-2-thienylglyoxylic acid,
3-methyl-2-thienylglyoxylic acid,
4-methoxy-2-thienylglyoxylic acid,
5-methylthio-2-thienylglyoxylic acid,
3-dimethylamino-2-thienylglyoxylic acid,
3-methanesulfonyl-2-thienylglyoxylic acid,
2-chloro-3-thienylglyoxylic acid,
2,4-dichloro-3-thienylglyoxylic acid,
2,4-dimethyl-3-thienylglyoxylic acid,
2,4-dinitro-3-thienylglyoxylic acid,
4-ethyl-3-thienylglyoxylic acid,
2-n-propyl-3-thienylglyoxylic acid,
2,4-dimethoxy-3-thienylglyoxylic acid,
2,4,5-trichloro-3-thienylglyoxylic acid, and
5-methyl-3-thienylglyoxylic acid, respectively, to produce sodium 7-[α-hydroxy-α-(3-chloro-2-thienyl)acetamido]cephalosporanate,
sodium 7-[α-hydroxy-α-(4-bromo-2-thienyl)acetamido]cephalosporanate,
sodium 7-[α-hydroxy-α-(5-iodo-2-thienyl)acetamido]cephalosporanate,
sodium 7-[α-hydroxy-α-(3-fluoro-2-thienyl)acetamido]cephalosporanate,
sodium 7-[α-hydroxy-α-(4-nitro-2-thienyl)acetamido]cephalosporanate,
sodium 7-[α-hydroxy-α-(3-methyl-2-thienyl)acetamido]cephalosporanate,
sodium 7-[α-hydroxy-α-(4-methoxy-2-thienyl)acetamido]cephalosporanate,
sodium 7-[α-hydroxy-α-(5-methylthio-2-thienyl)acetamido]cephalosporanate,
sodium 7-[α-hydroxy-α-(3-dimethylamino-2-thienyl)acetamido]cephalosporanate,
sodium 7-[α-hydroxy-α-(3-methanesulfonyl-2-thienyl)acetamido]cephalosoporanate,
sodium 7-[α-hydroxy-α-(2-chloro-3-thienyl)acetamido]cephalosporanate,
sodium 7-[α-hydroxy-α-(2,4-dichloro-3-thienyl)acetamido]cephalosporanate,
sodium 7-[α-hydroxy-α-(2,4-dimethyl-3-thienyl)acetamido]cephalosporanate,
sodium 7-[α-hydroxy-α-(2,4-dinitro-3-thienyl)acetamido]cephalosporanate,
sodium 7-[α-hydroxy-α-(4-ethyl-3-thienyl)acetamido]cephalosporanate,
sodium 7-[α-hydroxy-α-(2-n-propyl-3-thienyl)acetamido]cephalosporanate,
sodium 7-[α-hydroxy-α-(2,4-dimethoxy-3-thienyl)acetamido]cephalosporanate,
sodium 7-[α-hydroxy-α-(2,4,5-trichloro-3-thienyl)acetamido]cephalosporanate, and
sodium 7-[α-hydroxy-α-(5-methyl-3-thienyl)acetamido]cephalosporanate, respectively, which are each active antibacterial agents.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. A compound having the formula

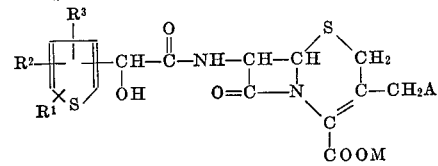

wherein:
R¹, R² and R³ are each hydrogen, chloro, bromo, fluoro, iodo, nitro, (lower)alkyl, (lower)alkoxy, (lower)alkylthio, di(lower)alkylamino, (lower)alkanoylamino, (lower)alkanoyl or (lower)alkylsulfonyl;

A is hydrogen, hydroxyl, (lower)alkanoyloxy, benzoyloxy, a quaternary ammonium radical having the structure

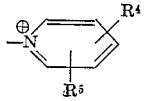

wherein $R^4$ and $R^5$ each represent hydrogen or methyl or, when taken together with M, a monovalent carbon-oxygen bond; and M is a pharmaceutically acceptable nontoxic cation selected from the group consisting of the metallic cations hydrogen, sodium, potassium, calcium and aluminum and the organic amine cations formed by the addition of a portion to a trialkylamine, procaine, dibenzylamine, N-benzyl-β-phenthylamine, 1 - ephenamine, N,N' - dibenzylethylenediamine, dehydroabietylamine, N,N'-bis-dehydroabietylethylenediamine or a N - (lower)alkylpiperidine, an anionic charge when A is a quaternary ammonium radical or, when taken together with A, a monovalent carbon-oxygen bond.

2. A compound of claim 1 having the formula

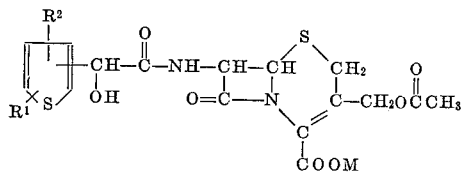

wherein $R^1$ and $R^2$ are each hydrogen or chloro or (lower)alkyl and M is a pharmaceutically acceptable, nontoxic cation selected from the group consisting of the metallic cations hydrogen, sodium, potassium, calcium and aluminum and the organic amine cations formed by the addition of a proton to a trialkylamine, procaine, dibenzylamine, N - benzyl-β-phenethylamine, 1-ephenamine, N,N'-dibenzylethylenediamine, dehydroabietylamine, N,N' - bis-dehydroabietylethylenediamine or a N-(lower)alkylpiperidine.

3. A compound of claim 1 having the formula

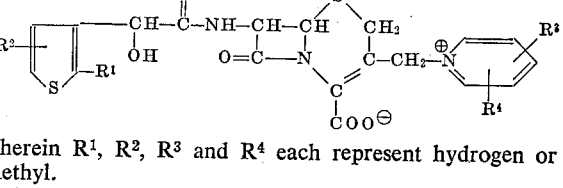

wherein $R^1$ and $R^2$ are each hydrogen or chloro or (lower)alkyl and M is a pharmaceutically acceptable, nontoxic cation selected from the group consisting of the metallic cations hydrogen, sodium, potassium, calcium and aluminum and the organic amine cations formed by the addition of a proton to a trialkylamine, procaine, dibenzylamine, N-benzyl-β-phenethylamine, 1-ephenamine, N,N'-dibenzylethylenediamine, dehydroabietylamine, N,N'-bis-dehydroabietylethylenediamine or a N-(lower)alkylpiperidine.

4. A compound of claim 1 having the formula

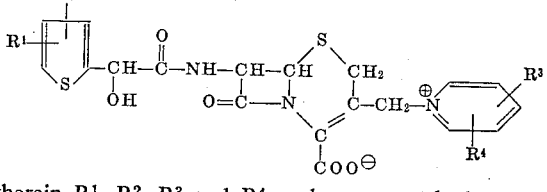

wherein $R^1$, $R^2$, $R^3$ and $R^4$ each represent hydrogen or methyl.

5. A compound of claim 1 having formula wherein $R^1$, $R^2$, $R^3$ and $R^4$ each represent hydrogen or methyl.

6. The compound of claim 1 having the name 7-[α-hydroxy-α-(2-thienyl)acetamido]cephalosporanic acid.

7. The compound of claim 1 having the name sodium 7-[α-hydroxy-α-(2-thienyl)acetamido]cephalosporanate.

References Cited

UNITED STATES PATENTS

| | | | |
|---|---|---|---|
| 3,127,394 | 3/1964 | Perron et al. | 260—243 |
| 3,129,224 | 4/1964 | Collins | 260—243 |
| 3,167,549 | 1/1965 | Hoover | 260—243 |
| 3,173,916 | 3/1965 | Shull et al. | 260—243 |
| 3,202,655 | 8/1965 | Perron et al. | 260—243 |
| 3,218,318 | 11/1965 | Flynn | 260—243 |
| 3,219,662 | 11/1965 | Abraham et al. | 260—243 |

FOREIGN PATENTS

| | | |
|---|---|---|
| 1,329,119 | 4/1963 | France. |
| 1,384,197 | 11/1964 | France. |

OTHER REFERENCES

Blicke et al.: J. Amer. Chem. Soc., 66 1645–1648.

NICHOLAS S. RIZZO, *Primary Examiner.*

U.S. Cl. X.R.

424—246